(12) United States Patent
Shao et al.

(10) Patent No.: US 8,577,610 B2
(45) Date of Patent: Nov. 5, 2013

(54) NAVIGATION SYSTEM WITH POINT OF INTEREST HARVESTING MECHANISM AND METHOD OF OPERATION THEREOF

(75) Inventors: Weili Shao, Redwood City, CA (US); Zehua Zhou, Sunnyvale, CA (US); Aliasgar Mumtaz Husain, Milpitas, CA (US)

(73) Assignee: Telenav Inc., Sunnyvale, CA (US)

( * ) Notice: Subject to any disclaimer, the term of this patent is extended or adjusted under 35 U.S.C. 154(b) by 131 days.

(21) Appl. No.: 13/334,015

(22) Filed: Dec. 21, 2011

(65) Prior Publication Data

US 2013/0166207 A1    Jun. 27, 2013

(51) Int. Cl.
*G01C 21/00* (2006.01)

(52) U.S. Cl.
USPC .......................................... 701/537; 701/426

(58) Field of Classification Search
USPC .................................. 701/426, 537
See application file for complete search history.

(56) References Cited

U.S. PATENT DOCUMENTS

| | | | |
|---|---|---|---|
| 5,793,968 A | 8/1998 | Gregerson et al. | |
| 6,351,755 B1 | 2/2002 | Najork et al. | |
| 6,564,251 B2 | 5/2003 | Katariya et al. | |
| 7,139,747 B1 | 11/2006 | Najork | |
| 7,685,296 B2 | 3/2010 | Brill et al. | |
| 7,694,065 B2 | 4/2010 | Petev et al. | |
| 7,822,705 B2 | 10/2010 | Xia | |
| 7,886,042 B2 | 2/2011 | Larsson et al. | |
| 8,037,055 B2 | 10/2011 | Brawer et al. | |
| 2008/0318547 A1* | 12/2008 | Ballou et al. | 455/410 |
| 2009/0119268 A1 | 5/2009 | Bandaru et al. | |
| 2010/0080411 A1 | 4/2010 | Deliyannis | |
| 2010/0241492 A1* | 9/2010 | Eglen et al. | 705/10 |
| 2010/0306249 A1* | 12/2010 | Hill et al. | 707/769 |
| 2011/0016090 A1 | 1/2011 | Krishnaprasad et al. | |

OTHER PUBLICATIONS

Raghavan et al., "Crawling the Hidden Web", 2011, pp. 10 pages, Publisher: Stanford University, Computer Science Deptartment, Published in: Stanford, CA, US.

* cited by examiner

*Primary Examiner* — Hussein A. Elchanti
(74) *Attorney, Agent, or Firm* — IP Investment Law Group

(57) ABSTRACT

A method of operation of a navigation system includes: generating an extraction job including a crawl task based on a location of a point of interest and a web form type of a website for harvesting the point of interest from the website; receiving a heartbeat from a distributed cache for determining when a client device is available to execute the extraction job; generating an assignment schedule of the extraction job based on the heartbeat for distributing the extraction job to the client device to retrieve a location-based field; and receiving the location-based field associated with the point of interest for displaying on a monitor device.

20 Claims, 8 Drawing Sheets

NAVIGATION SYSTEM WITH POINT OF INTEREST HARVESTING MECHANISM AND METHOD OF OPERATION THEREOF

TECHNICAL FIELD

The present invention relates generally to a navigation system, and more particularly to a navigation system with a point of interest harvesting mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information. This real-time information can be extracted from pool of documents, such as from the World Wide Web or the Internet. However, a failure to extract all the fields and align the fields from one document to another document continues to be a paramount concern for the consumer.

Thus, a need still remains for a navigation system with point of interest harvesting mechanism to collect POI information from different fields in different document pages. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating an extraction job including a crawl task based on a location of a point of interest and a web form type of a website for harvesting the point of interest from the website; receiving a heartbeat from a distributed cache for determining when a client device is available to execute the extraction job; generating an assignment schedule of the extraction job based on the heartbeat for distributing the extraction job to the client device to retrieve a location-based field; and receiving the location-based field associated with the point of interest for displaying on a monitor device.

The present invention provides a navigation system including: a job generation module, for generating an extraction job including a crawl task based on a location of a point of interest and a web form type of a website for harvesting the point of interest from the website; a cache communication module, coupled to the job generation module, for receiving a heartbeat from a distributed cache for determining when a client device is available to execute the extraction job; a job distribution module, coupled to the cache communication module, for generating an assignment schedule of the extraction job based on the heartbeat for distributing the extraction job to the client device to retrieve a location-based field; and a compiler module, coupled to the job distribution module, for receiving the location-based field associated with the point of interest for displaying on a monitor device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
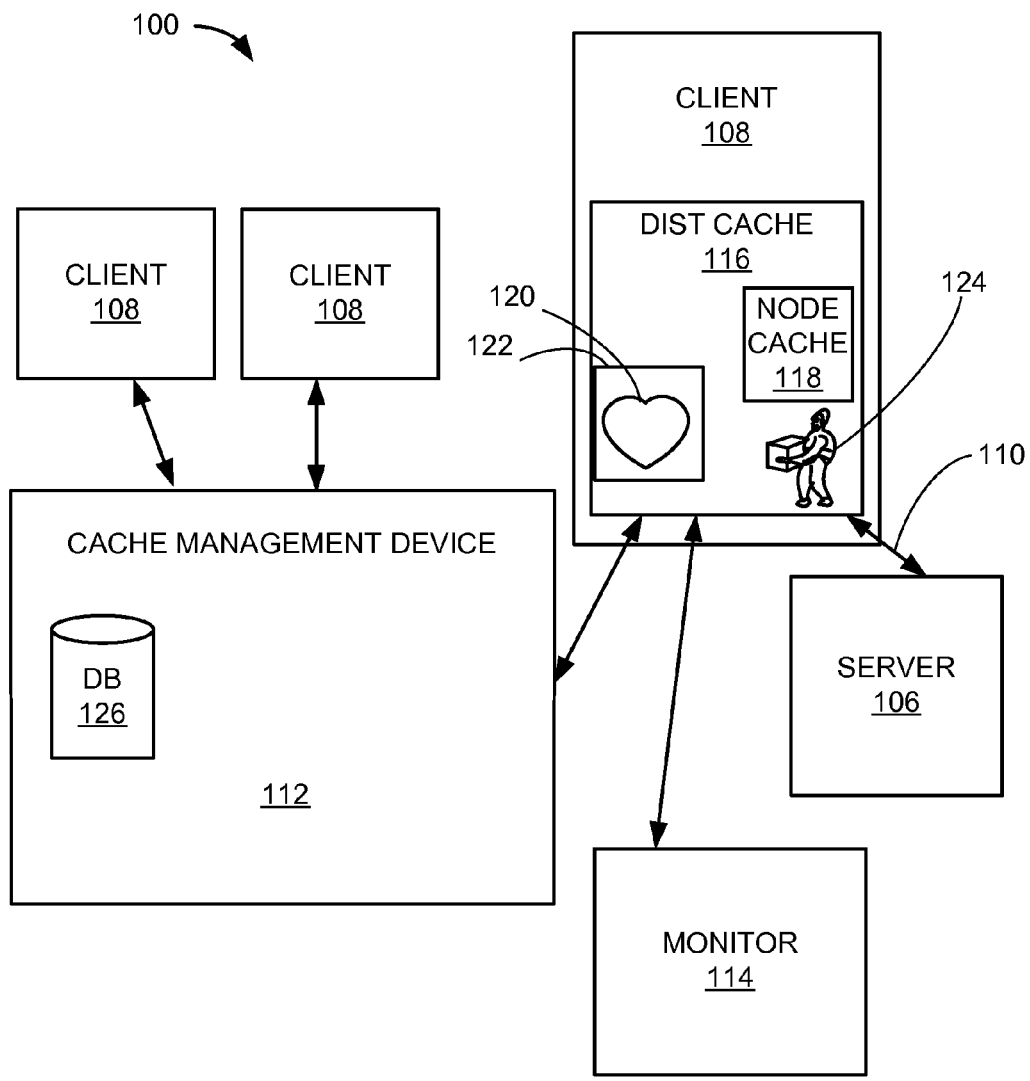
FIG. 1 is a navigation system with point of interest harvesting mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. As a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "navigation-related information" or "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with point of interest harvesting mechanism in an embodiment of the present invention. The navigation system 100 includes a server device 106, such as a desktop computer or a dedicated server. The server device 106 can be connected to a client device 108, such as a laptop computer, a desktop computer, or a client computing device, with a communication channel 110, such as a wireless or wired network. The client device 108 can be connected to a cache management device 112, such as java messaging service server, via the communication channel 110. The cache management device 112 is defined as a device capable of relaying messages between two or more of the client device 108. The server device 106 can be connected to the cache management device 112 via the communication channel 110.

A monitor device 114 can be connected to the server device 106, the client device 108, and the cache management device 112 via the communication channel 110. The monitor device 114, for example, can be a desktop computer, a portable navigation device, or a cell phone.

For example, the server device 106 can be of any of a variety of devices, such as a notebook computer, a desktop computer, a specialized computer for running computational task on behalf of the client device 108. The server device 106 can be a standalone device, or can be incorporated in a cluster. The server device 106 can couple to the communication channel 110 to communicate with the client device 108, the cache management device 112, or the monitor device 114.

In another example, the server device 106 can be a particularized machine, such as a mainframe, a server, a cluster server, rack mounted server, or a blade server, or as more specific examples, an IBM System z10™ Business Class mainframe or a HP ProLiant ML™ server. Yet another example, the client device 108 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the server device 106 as a server device, although it is understood that the server device 106 can be different types of computing devices. For example, the server device 106 can also be a client device, such as a node on a cloud computing network, a cloud computing network, or a laptop computer.

The client device 108 can be any of a variety of centralized or decentralized computing devices. For example, the client device 108 can be a computer, grid computing resources, a virtualized computer resource, cloud computing resource, routers, switches, peer-to-peer distributed computing devices, or a combination thereof. The client device 108 can be centralized in a single computer room, distributed across different rooms, distributed across different geographical locations, embedded within a telecommunications network. The client device 108 can have a means for coupling with the communication channel 110 to communicate with the server device 106, the cache management device 112, or the monitor device 114. The client device 108 can also be a server type device as described for the server device 106.

The cache management device 112 can be any of a variety of centralized or decentralized computing devices. For example, the cache management device 112 can be a computer, grid computing resources, a virtualized computer resource, cloud computing resource, routers, switches, peer-to-peer distributed computing devices, or a combination thereof. The cache management device 112 can be centralized in a single computer room, distributed across different rooms, distributed across different geographical locations, embedded within a telecommunications network. The cache management device 112 can have a means for coupling with the communication channel 110 to communicate with the server device 106, the client device 108, or the monitor device 114.

The cache management device 112 can manage a distributed cache 116. The distributed cache 116 is defined as a shared and network-accessible memory stored on a cluster of devices. The distributed cache 116 allows caching to span across multiple computing devices including the client device 108, the server device 106, or the monitor device 114.

For example, the client device 108 can be part of the cluster of the devices of the distributed cache 116. Every node in the distributed cache 116 can contain a node cache portion 118, which is synchronized using the cache management device 112. The node cache portion 118 can keep all the required information about the neighboring nodes. The node cache portion 118 of the distributed cache 116 can contain all the status information in the associated node, including running job list, assigned job list, or a combination thereof.

When the server device 106 attempts to request access to the distributed cache 116, the server device 106 can make the request to the cache management device 112, and the cache management device 112 can then relay the request to the client device 108 containing a specific portion of the distributed cache 116 that needs to be accessed.

Applications connected to the communication channel 110 can access the distributed cache 116, including reading and writing to the distributed cache 116. For example, all of the underlying communication of the nodes of the distributed cache 116 can be hidden from the server device 106, the client device 108, and the monitor device 114. When an object is store into the distributed cache 116 in one node of the distributed cache 116, the object can be retrieved at any node within the distributed cache 116.

For example, when the client device 108 starts, the client device 108 can periodically put a heartbeat 120 into a heartbeat cache portion 122 of the distributed cache 116. The client device 108 can also place a node load 124 of the client device 108 into the distributed cache 116. The heartbeat 120 is defined as a message associated with the client device 108 indicating the health state of the client device 108 at a particular time. The heartbeat 120 can contain a node identification, node type, node status, a timestamp, or a combination thereof. The node load 124 is defined as a message associated with the client device 108 indicating a workload state of the client device 108.

The cache management device 112 can include a database 126. The database 126 is defined as non-transitory storage to save and retrieve information related to the navigation system 100. The cache management device 112 can first update the distributed cache 116 when new entries are entered, and then update the database 126 if necessary.

Although it is illustrated that the database 126 resides on the cache management device 112, it is understood that the database 126 can also reside on other devices in the navigation system 100. For example, the database 126 can reside on an instance of the client device 108. For another example, the database 126 can reside on the server device 106. The database 126 can contain all or a portion of the distributed cache 116. Alternatively, the distributed cache 116 can contain all or a portion of the database 126.

When the distributed cache 116 is used on top of the database 126, the database 126 can have its load significantly reduced. The distributed cache 116 can improve the overall system stability of the navigation system 100 because it can be used for transparent client-server cluster maintenance and data sharing.

The cache management device 112 can provide underlying communication for the distributed cache 116. For example, the cache management device 112 can be a Java Message Service (JMS) server. The cache management device 112 can bypass network firewalls by using JMS.

The monitor device 114 can be of any of a variety of devices with a display interface, such as a laptop computer, cellular phone, personal digital assistant, a notebook computer, a desktop computer, a specialized device to display location-based information, or other multi-functional communication or entertainment device. The monitor device 114 can be a standalone device, or can be incorporated with a vehicle, for example a car, truck, bus, or train. The monitor device 114 can couple to the communication channel 110 to communicate with the distributed cache 116, the client device 108, the cache management device 112, or the monitor device 114.

For illustrative purposes, the navigation system 100 is described with the server device 106, the client device 108, the cache management device 112, the monitor device 114 as single computing devices, although it is understood that these devices can be a cluster of computing devices. For example, the cache management device 112 and the server device 106 can be a cluster of computing servers. For another example, the monitor device 114 can be both a mobile navigation device and a monitoring desktop, each performing a separate function of the monitor device 114.

Also for illustrative purposes, the navigation system 100 is shown with the server device 106, the client device 108, the cache management device 112, and the monitor device 114 as end points of the communication channel 110, although it is understood that the navigation system 100 can have a different partition between the server device 106, the client device 108, and the communication channel 110. For example, the server device 106, the client device 108, the cache management device 112, or a combination thereof can also function as part of the communication channel 110.

The communication channel 110 can be a variety of networks. For example, the communication channel 110 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication channel 110. Ethernet, digital subscriber line (DSL), fiber to the home (FTTH), and plain old telephone service (POTS) are examples of wired communication that can be included in the communication channel 110.

Further, the communication channel 110 can traverse a number of network topologies and distances. For example, the communication channel 110 can include direct connection, personal area network (PAN), local area network (LAN), metropolitan area network (MAN), wide area network (WAN) or any combination thereof.

The server device 106 can maintain client-server cluster. The server device 106 can communicate with the client device 108 and vice versa via the distributed cache 116 managed by the cache management device 112.

Figure 2:
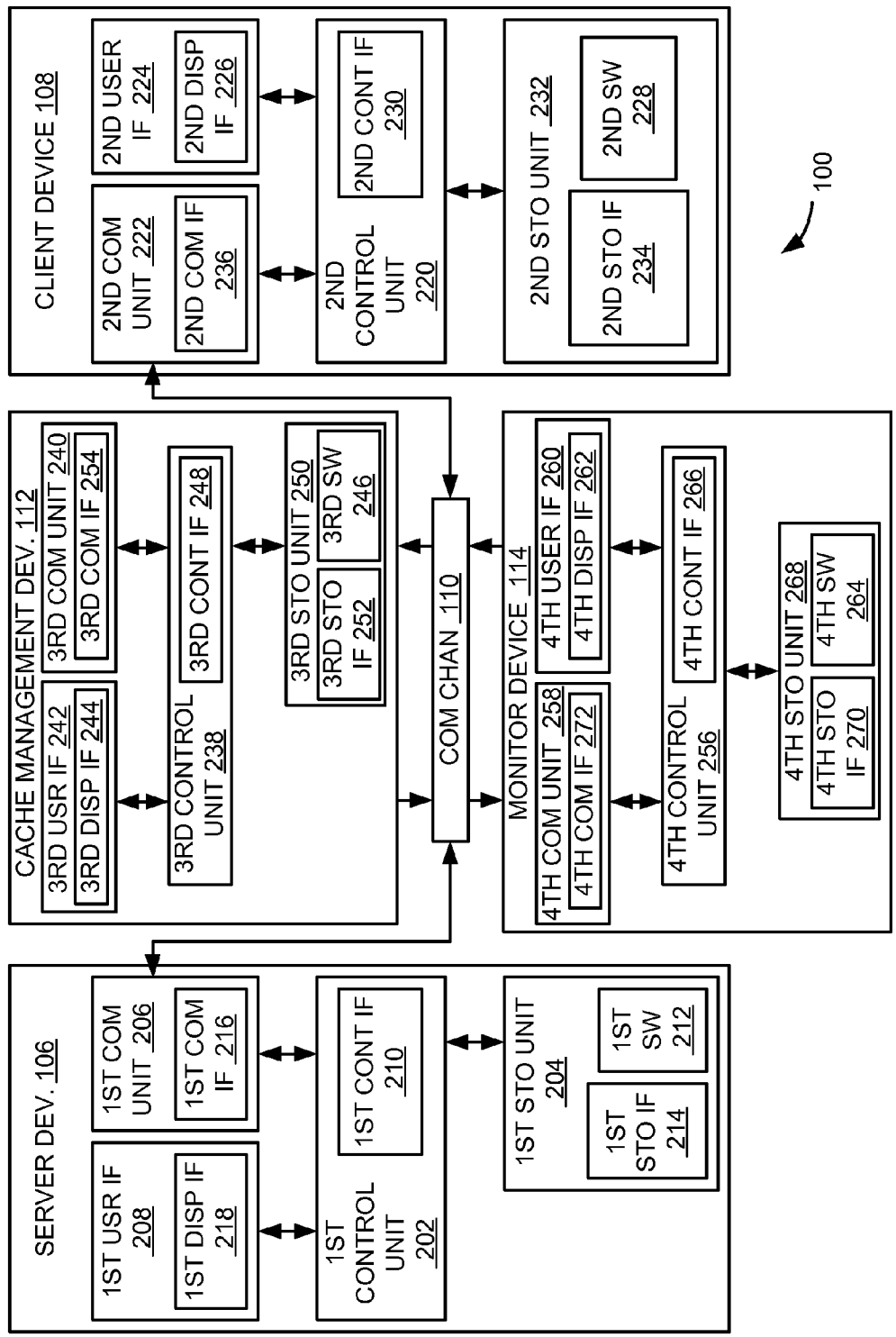
FIG. 2 is an exemplary block diagram of the navigation system.

Referring now to FIG. 2, therein is shown an exemplary block diagram of the navigation system 100 of FIG. 1. The navigation system 100 can include the server device 106, the communication channel 110, the client device 108, and the monitor device 114.

The server device 106 can include a first control unit 202, a first storage unit 204, a first communication unit 206, and a first user interface 208. The first control unit 202 can include a first control interface 210. The first control unit 202 can execute a first software 212 to provide the intelligence of the navigation system 100. The first control unit 202 can be implemented in a number of different manners. For example, the first control unit 202 can be a processor, an embedded processor, a microprocessor, a hardware control logic, a hardware finite state machine (FSM), a digital signal processor (DSP), or a combination thereof. The first control interface 210 can be used for communication between the first control unit 202 and other functional units in the server device 106. The first control interface 210 can also be used for communication that is external to the server device 106.

The first control interface 210 can receive information from the other functional units or from external sources, or can transmit information to the other functional units or to external destinations. The external sources and the external destinations refer to sources and destinations physically separate from the server device 106.

The first control interface 210 can be implemented in different ways and can include different implementations depending on which functional units or external units are being interfaced with the first control interface 210. For example, the first control interface 210 can be implemented with a pressure sensor, an inertial sensor, a microelectromechanical system (MEMS), optical circuitry, waveguides, wireless circuitry, wireline circuitry, or a combination thereof.

The first storage unit 204 can store the first software 212. The first storage unit 204 can also store the relevant information, such as advertisements, points of interest (POI), navigation routing entries, or any combination thereof.

The first storage unit 204 can be a volatile memory, a nonvolatile memory, an internal memory, an external memory, or a combination thereof. For example, the first storage unit 204 can be a nonvolatile storage such as non-volatile random access memory (NVRAM), Flash memory, disk storage, or a volatile storage such as static random access memory (SRAM).

The first storage unit 204 can include a first storage interface 214. The first storage interface 214 can be used for communication between the first storage unit 204 and other functional units in the server device 106. The first storage interface 214 can be used for communication that is external to the server device 106.

The first storage interface 214 can receive information from the other functional units or from external sources, or can transmit information to the other functional units or to external destinations. The external sources and the external destinations refer to sources and destinations physically separate from the server device 106.

The first storage interface 214 can include different implementations depending on which functional units or external units are being interfaced with the first storage unit 204. The first storage interface 214 can be implemented with technologies and techniques similar to the implementation of the first control interface 210.

The first communication unit 206 can enable external communication to and from the server device 106. For example, the first communication unit 206 can permit the server device 106 to communicate with the client device 108 of FIG. 1, such as a peripheral device or a computer desktop, and the communication channel 110.

The first communication unit 206 can also function as a communication hub allowing the server device 106 to function as part of the communication channel 110 and not limited to be an end point or terminal unit to the communication channel 110. The first communication unit 206 can include active and passive components, such as microelectronics or an antenna, for interaction with the communication channel 110.

The first communication unit 206 can include a first communication interface 216. The first communication interface 216 can be used for communication between the first communication unit 206 and other functional units in the server device 106. The first communication interface 216 can receive information from the other functional units or can transmit information to the other functional units.

The first communication interface 216 can include different implementations depending on which functional units are being interfaced with the first communication unit 206. The first communication interface 216 can be implemented with technologies and techniques similar to the implementation of the first control interface 210.

The first user interface 208 allows a user (not shown) to interface and interact with the server device 106. The first user interface 208 can include an input device and an output device. Examples of the input device of the first user interface 208 can include a keypad, a touchpad, soft-keys, a keyboard, a microphone, or any combination thereof to provide data and communication inputs.

The first user interface 208 can include a first display interface 218. The first display interface 218 can include a display, a projector, a video screen, a speaker, or any combination thereof.

The first control unit 202 can operate the first user interface 208 to display information generated by the navigation system 100. The first control unit 202 can also execute the first software 212 for the other functions of the navigation system 100. The first control unit 202 can further execute the first software 212 for interaction with the communication channel 110 via the first communication unit 206.

The client device 108 can be optimized for implementing the present invention in a multiple device embodiment with the server device 106. The client device 108 can provide the additional or higher performance processing power compared to the server device 106. The client device 108 can include a second control unit 220, a second communication unit 222, and a second user interface 224.

The second user interface 224 allows a user (not shown) to interface and interact with the client device 108. The second user interface 224 can include an input device and an output device. Examples of the input device of the second user interface 224 can include a keypad, a touchpad, soft-keys, a keyboard, a microphone, or any combination thereof to provide data and communication inputs. Examples of the output device of the second user interface 224 can include a second display interface 226. The second display interface 226 can include a display, a projector, a video screen, a speaker, or any combination thereof.

The second control unit 220 can execute a second software 228 to provide the intelligence of the client device 108 of the navigation system 100. The second software 228 can operate in conjunction with the first software 212. The second control unit 220 can provide additional performance compared to the first control unit 202.

The second control unit 220 can operate the second user interface 224 to display information. The second control unit 220 can also execute the second software 228 for the other functions of the navigation system 100, including operating the second communication unit 222 to communicate with the server device 106 over the communication channel 110.

The second control unit 220 can be implemented in a number of different manners. For example, the second control unit 220 can be a processor, an embedded processor, a microprocessor, a hardware control logic, a hardware finite state machine (FSM), a digital signal processor (DSP), or a combination thereof.

The second control unit 220 can include a second control interface 230. The second control interface 230 can be used for communication between the second control unit 220 and other functional units in the client device 108. The second control interface 230 can also be used for communication that is external to the client device 108.

The second control interface 230 can receive information from the other functional units or from external sources, or can transmit information to the other functional units or to external destinations. The external sources and the external destinations refer to sources and destinations physically separate from the client device 108.

The second control interface 230 can be implemented in different ways and can include different implementations depending on which functional units or external units are being interfaced with the second control interface 230. For example, the second control interface 230 can be implemented with a pressure sensor, an inertial sensor, a microelectromechanical system (MEMS), optical circuitry, waveguides, wireless circuitry, wireline circuitry, or a combination thereof.

A second storage unit 232 can store the second software 228. The second storage unit 232 can also store the relevant information, such as advertisements, points of interest (POI), navigation routing entries, or any combination thereof. The second storage unit 232 can be sized to provide the additional storage capacity to supplement the first storage unit 204.

For illustrative purposes, the second storage unit 232 is shown as a single element, although it is understood that the second storage unit 232 can be a distribution of storage elements. Also for illustrative purposes, the navigation system 100 is shown with the second storage unit 232 as a single hierarchy storage system, although it is understood that the navigation system 100 can have the second storage unit 232 in a different configuration. For example, the second storage unit 232 can be formed with different storage technologies forming a memory hierarchal system including different levels of caching, main memory, rotating media, or off-line storage.

The second storage unit 232 can be a volatile memory, a nonvolatile memory, an internal memory, an external memory, or a combination thereof. For example, the second storage unit 232 can be a nonvolatile storage such as nonvolatile random access memory (NVRAM), Flash memory, disk storage, or a volatile storage such as static random access memory (SRAM).

The second storage unit 232 can include a second storage interface 234. The second storage interface 234 can be used for communication between the second storage unit 232 and other functional units in the client device 108. The second storage interface 234 can be used for communication that is external to the client device 108.

The second storage interface 234 can receive information from the other functional units or from external sources, or can transmit information to the other functional units or to external destinations. The external sources and the external destinations refer to sources and destinations physically separate from the client device 108.

The second storage interface 234 can include different implementations depending on which functional units or external units are being interfaced with the second storage unit 232. The second storage interface 234 can be implemented with technologies and techniques similar to the implementation of the second control interface 230.

The second communication unit 222 can enable external communication to and from the client device 108. For example, the second communication unit 222 can permit the client device 108 to communicate with the server device 106 over the communication channel 110.

The second communication unit 222 can also function as a communication hub allowing the client device 108 to function as part of the communication channel 110 and not limited to be an end point or terminal unit to the communication channel 110. The second communication unit 222 can include active and passive components, such as microelectronics or an antenna, for interaction with the communication channel 110.

The second communication unit 222 can include a second communication interface 236. The second communication interface 236 can be used for communication between the second communication unit 222 and other functional units in the client device 108. The second communication interface 236 can receive information from the other functional units or can transmit information to the other functional units.

The second communication interface 236 can include different implementations depending on which functional units are being interfaced with the second communication unit 222. The second communication interface 236 can be implemented with technologies and techniques similar to the implementation of the second control interface 230.

The first communication unit 206 can couple with the communication channel 110 to send information to the client device 108. The client device 108 can receive information in the second communication unit 222 from the communication channel 110.

The second communication unit 222 can couple with the communication channel 110 to send information to the server device 106. The server device 106 can receive information in the first communication unit 206 from the communication channel 110. The navigation system 100 can be executed by the first control unit 202, the second control unit 220, or a combination thereof.

For illustrative purposes, the client device 108 is shown with the partition having the second user interface 224, the second storage unit 232, the second control unit 220, and the second communication unit 222, although it is understood that the client device 108 can have a different partition. For example, the second software 228 can be partitioned differently such that some or all of its function can be in the second control unit 220 and the second communication unit 222. Also, the client device 108 can include other functional units not shown in FIG. 2 for clarity.

The cache management device 112 can be optimized for implementing the present invention in a multiple device embodiment with the server device 106, the client device 108, and the monitor device 114. The cache management device 112 can provide the additional or higher performance memory management compared to the server device 106. The cache management device 112 can include a third control unit 238, a third communication unit 240, and a third user interface 242.

The third user interface 242 allows a user (not shown) to interface and interact with the cache management device 112. The third user interface 242 can include an input device and an output device. Examples of the input device of the third user interface 242 can include a keypad, a touchpad, softkeys, a keyboard, a microphone, or any combination thereof to provide data and communication inputs. Examples of the output device of the third user interface 242 can include a third display interface 244. The third display interface 244 can include a display, a projector, a video screen, a speaker, or any combination thereof.

The third control unit 238 can execute a third software 246 to provide the intelligence of the cache management device 112 of the navigation system 100. The third software 246 can operate in conjunction with the first software 212 and the second software 228. The third control unit 238 can provide additional performance or processing cache and memory compared to the server device 106 or the client device 108.

The third control unit 238 can operate the third user interface 242 to display information. The third control unit 238 can also execute the third software 246 for the other functions of the navigation system 100, including operating the third communication unit 240 to communicate with the server device 106 over the communication channel 110.

The third control unit 238 can be implemented in a number of different manners. For example, the third control unit 238 can be a processor, an embedded processor, a microprocessor, a hardware control logic, a hardware finite state machine (FSM), a digital signal processor (DSP), or a combination thereof.

The third control unit 238 can include a third control interface 248. The third control interface 248 can be used for communication between the third control unit 238 and other functional units in the cache management device 112. The third control interface 248 can also be used for communication that is external to the cache management device 112.

The third control interface 248 can receive information from the other functional units or from external sources, or can transmit information to the other functional units or to external destinations. The external sources and the external destinations refer to sources and destinations physically separate from the cache management device 112.

The third control interface 248 can be implemented in different ways and can include different implementations depending on which functional units or external units are being interfaced with the third control interface 248. For example, the third control interface 248 can be implemented with a pressure sensor, an inertial sensor, a microelectromechanical system (MEMS), optical circuitry, waveguides, wireless circuitry, wireline circuitry, or a combination thereof.

A third storage unit 250 can store the third software 246. The third storage unit 250 can also store the relevant information, such as advertisements, points of interest (POI), navigation routing entries, or any combination thereof. The third storage unit 250 can be sized to provide the additional storage capacity to supplement the first storage unit 204 or the second storage unit 232.

For illustrative purposes, the third storage unit 250 is shown as a single element, although it is understood that the third storage unit 250 can be a distribution of storage elements. Also for illustrative purposes, the navigation system 100 is shown with the third storage unit 250 as a single hierarchy storage system, although it is understood that the navigation system 100 can have the third storage unit 250 in a different configuration. For example, the third storage unit 250 can be formed with different storage technologies forming a memory hierarchal system including different levels of caching, main memory, rotating media, or off-line storage.

The third storage unit 250 can be a volatile memory, a nonvolatile memory, an internal memory, an external memory, or a combination thereof. For example, the third storage unit 250 can be a nonvolatile storage such as nonvolatile random access memory (NVRAM), Flash memory, disk storage, or a volatile storage such as static random access memory (SRAM).

The third storage unit 250 can include a third storage interface 252. The third storage interface 252 can be used for communication between the third storage unit 250 and other functional units in the cache management device 112. The third storage interface 252 can be used for communication that is external to the cache management device 112.

The third storage interface 252 can receive information from the other functional units or from external sources, or can transmit information to the other functional units or to external destinations. The external sources and the external destinations refer to sources and destinations physically separate from the cache management device 112.

The third storage interface 252 can include different implementations depending on which functional units or external units are being interfaced with the third storage unit 250. The third storage interface 252 can be implemented with technologies and techniques similar to the implementation of the third control interface 248.

The third communication unit 240 can enable external communication to and from the cache management device 112. For example, the third communication unit 240 can permit the cache management device 112 to communicate with the server device 106 over the communication channel 110.

The third communication unit 240 can also function as a communication hub allowing the cache management device 112 to function as part of the communication channel 110 and not limited to be an end point or terminal unit to the communication channel 110. The third communication unit 240 can include active and passive components, such as microelectronics or an antenna, for interaction with the communication channel 110.

The third communication unit 240 can include a third communication interface 254. The third communication interface 254 can be used for communication between the third communication unit 240 and other functional units in the cache management device 112. The third communication interface 254 can receive information from the other functional units or can transmit information to the other functional units.

The third communication interface 254 can include different implementations depending on which functional units are being interfaced with the third communication unit 240. The third communication interface 254 can be implemented with technologies and techniques similar to the implementation of the third control interface 248.

The first communication unit 206 can couple with the communication channel 110 to send information to the cache management device 112. The cache management device 112 can receive information in the third communication unit 240 from the communication channel 110.

The third communication unit 240 can couple with the communication channel 110 to send information to the server device 106, the client device 108, or the monitor device 114. The server device 106 can receive information in the first communication unit 206 or the second communication unit 222 from the communication channel 110. The navigation system 100 can be executed by the first control unit 202, the second control unit 220, the third control unit 238, or a combination thereof.

For illustrative purposes, the cache management device 112 is shown with the partition having the third user interface 242, the third storage unit 250, the third control unit 238, and the third communication unit 240, although it is understood that the cache management device 112 can have a different partition. For example, the third software 246 can be partitioned differently such that some or all of its function can be in the third control unit 238 and the third communication unit 240. Also, the cache management device 112 can include other functional units not shown in FIG. 2 for clarity.

The monitor device 114 can be optimized for implementing the present invention in a multiple device embodiment with the server device 106, the client device 108, and the cache management device 112. The monitor device 114 can provide additional monitoring or displaying capability compared to the server device 106, the client device 108, or the cache management device 112. The monitor device 114 can include a fourth control unit 256, a fourth communication unit 258, and a fourth user interface 260.

The fourth user interface 260 allows a user (not shown) to interface and interact with the monitor device 114. The fourth user interface 260 can include an input device and an output device. Examples of the input device of the fourth user interface 260 can include a keypad, a touchpad, soft-keys, a keyboard, a microphone, or any combination thereof to provide data and communication inputs. Examples of the output device of the fourth user interface 260 can include a fourth display interface 262. The fourth display interface 262 can include a display, a projector, a video screen, a speaker, or any combination thereof.

The fourth control unit 256 can execute a fourth software 264 to provide the intelligence of the monitor device 114 of the navigation system 100. The fourth software 264 can operate in conjunction with the first software 212 and the second software 228.

The fourth control unit 256 can operate the fourth user interface 260 to display information. The fourth control unit 256 can also execute the fourth software 264 for the other functions of the navigation system 100, including operating the fourth communication unit 258 to communicate with the server device 106 over the communication channel 110.

The fourth control unit 256 can be implemented in a number of different manners. For example, the fourth control unit 256 can be a processor, an embedded processor, a microprocessor, a hardware control logic, a hardware finite state machine (FSM), a digital signal processor (DSP), or a combination thereof.

The fourth control unit 256 can include a fourth control interface 266. The fourth control interface 266 can be used for communication between the fourth control unit 256 and other functional units in the monitor device 114. The fourth control interface 266 can also be used for communication that is external to the monitor device 114.

The fourth control interface 266 can receive information from the other functional units or from external sources, or can transmit information to the other functional units or to external destinations. The external sources and the external destinations refer to sources and destinations physically separate from the monitor device 114.

The fourth control interface 266 can be implemented in different ways and can include different implementations depending on which functional units or external units are being interfaced with the fourth control interface 266. For example, the fourth control interface 266 can be implemented with a pressure sensor, an inertial sensor, a microelectromechanical system (MEMS), optical circuitry, waveguides, wireless circuitry, wireline circuitry, or a combination thereof.

A fourth storage unit 268 can store the fourth software 264. The fourth storage unit 268 can also store the relevant information, such as advertisements, points of interest (POI), navigation routing entries, or any combination thereof.

For illustrative purposes, the fourth storage unit 268 is shown as a single element, although it is understood that the fourth storage unit 268 can be a distribution of storage elements. Also for illustrative purposes, the navigation system 100 is shown with the fourth storage unit 268 as a single hierarchy storage system, although it is understood that the navigation system 100 can have the fourth storage unit 268 in a different configuration. For example, the fourth storage unit 268 can be formed with different storage technologies forming a memory hierarchal system including different levels of caching, main memory, rotating media, or off-line storage.

The fourth storage unit 268 can be a volatile memory, a nonvolatile memory, an internal memory, an external memory, or a combination thereof. For example, the fourth storage unit 268 can be a nonvolatile storage such as non-volatile random access memory (NVRAM), Flash memory, disk storage, or a volatile storage such as static random access memory (SRAM).

The fourth storage unit 268 can include a fourth storage interface 270. The fourth storage interface 270 can be used for communication between the fourth storage unit 268 and other functional units in the monitor device 114. The fourth storage interface 270 can be used for communication that is external to the monitor device 114.

The fourth storage interface 270 can receive information from the other functional units or from external sources, or can transmit information to the other functional units or to external destinations. The external sources and the external destinations refer to sources and destinations physically separate from the monitor device 114.

The fourth storage interface 270 can include different implementations depending on which functional units or external units are being interfaced with the fourth storage unit 268. The fourth storage interface 270 can be implemented with technologies and techniques similar to the implementation of the fourth control interface 266.

The fourth communication unit 258 can enable external communication to and from the monitor device 114. For example, the fourth communication unit 258 can permit the monitor device 114 to communicate with the server device 106 over the communication channel 110.

The fourth communication unit 258 can also function as a communication hub allowing the monitor device 114 to function as part of the communication channel 110 and not limited to be an end point or terminal unit to the communication channel 110. The fourth communication unit 258 can include active and passive components, such as microelectronics or an antenna, for interaction with the communication channel 110.

The fourth communication unit 258 can include a fourth communication interface 272. The fourth communication interface 272 can be used for communication between the fourth communication unit 258 and other functional units in the monitor device 114. The fourth communication interface 272 can receive information from the other functional units or can transmit information to the other functional units.

The fourth communication interface 272 can include different implementations depending on which functional units are being interfaced with the fourth communication unit 258. The fourth communication interface 272 can be implemented with technologies and techniques similar to the implementation of the fourth control interface 266.

The first communication unit 206 can couple with the communication channel 110 to send information to the monitor device 114. The monitor device 114 can receive information in the fourth communication unit 258 from the communication channel 110.

The fourth communication unit 258 can couple with the communication channel 110 to send information to the server device 106, the client device 108, or the cache management device 112. The server device 106 can receive information in the first communication unit 206, the second communication unit 222, and the third communication unit 240 from the communication channel 110. The navigation system 100 can be executed by the first control unit 202, the second control unit 220, the third control unit 238, the fourth control unit 256, or a combination thereof.

For illustrative purposes, the monitor device 114 is shown with the partition having the fourth user interface 260, the fourth storage unit 268, the fourth control unit 256, and the fourth communication unit 258, although it is understood that the monitor device 114 can have a different partition. For example, the fourth software 264 can be partitioned differently such that some or all of its function can be in the fourth control unit 256 and the fourth communication unit 258. Also, the monitor device 114 can include other functional units not shown in FIG. 2 for clarity.

The functional units in the server device 106 can work individually and independently of the other functional units. The server device 106 can work individually and independently from the client device 108, the cache management device 112, the monitor device 114, and the communication channel 110. The functional units in the client device 108 can work individually and independently of the other functional units. The client device 108 can work individually and independently from the server device 106, the cache management device 112, the monitor device 114, and the communication channel 110. The functional units in the cache management device 112 can work individually and independently of the other functional units. The cache management device 112 can work individually and independently from the server device 106, the client device 108, the monitor device 114, and the communication channel 110. The functional units in the monitor device 114 can work individually and independently of the other functional units. The monitor device 114 can work individually and independently from the server device 106, the client device 108, the cache management device 112, and the communication channel 110.

For illustrative purposes, the navigation system 100 is described by operation of the server device 106, the client device 108, the cache management device 112, and the monitor device 114. It is understood that the server device 106, the client device 108, the cache management device 112, and the monitor device 114 can operate any of the modules and functions of the navigation system 100.

Figure 3:
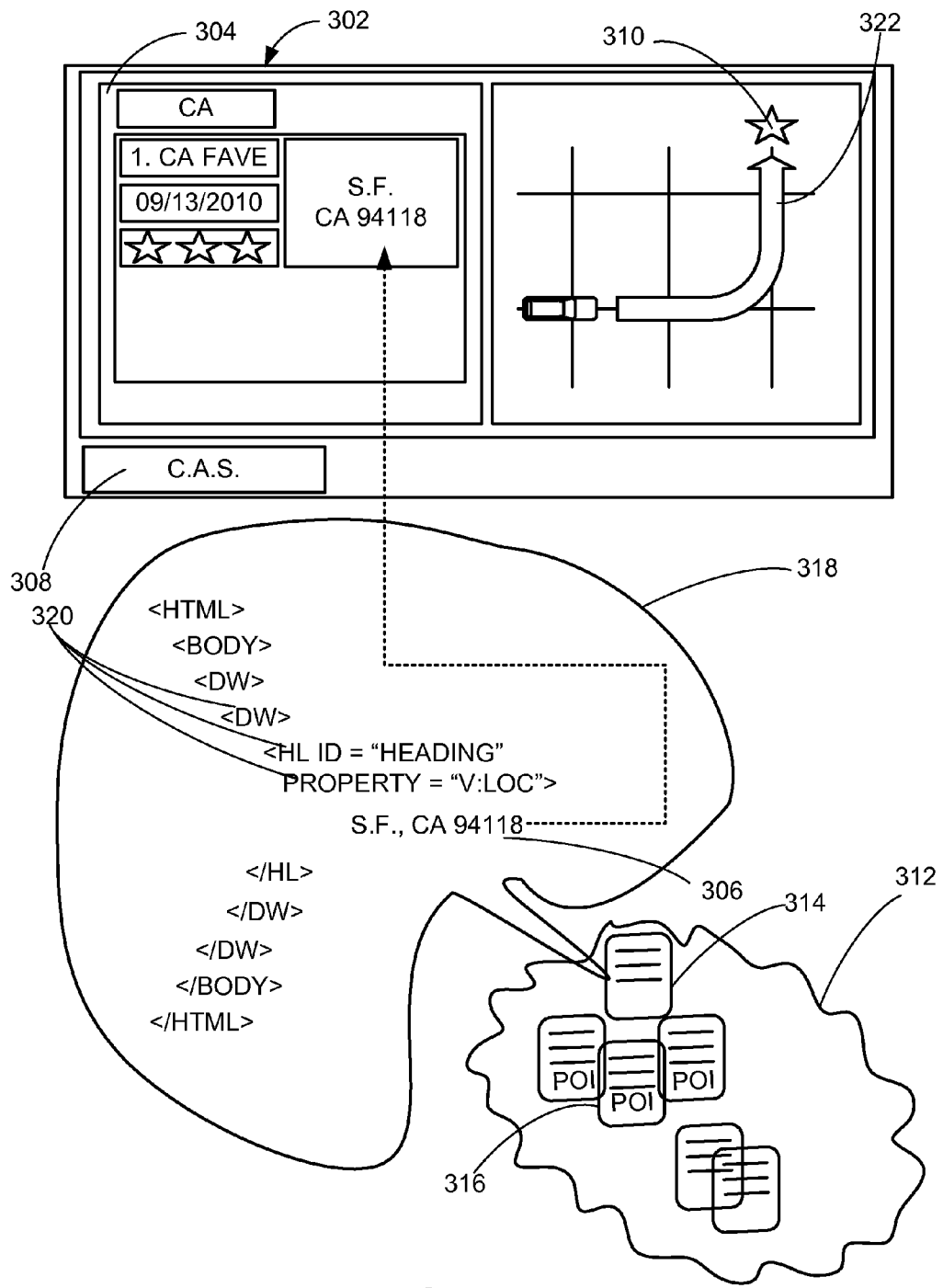
FIG. 3 is a display example of a location-based guide of the navigation system of FIG. 1.

Referring now to FIG. 3, therein is shown a display example of a location-based guide 302 of the navigation system 100 of FIG. 1. The location-based guide 302 is defined as a display of location relevant information. The location-based guide 302 can include a location relevant page 304 generated by the navigation system 100. The location relevant page 304 is defined as a page of location-based fields 306 associated with a point of interest 308. The point of interest 308 is defined as a physical entity of interest having a location 310. For example, the point of interest 308 can be California, the San Diego Zoo, or a Home Depot in Palo Alto.

The location 310 is defined as a description of geographical point or specific area within a coordinate system. For example, the navigation system 100 can extract with the client device 108 of FIG. 1 the location-based fields 306 associated with the point of interest 308 from a website 312, and send the location-based fields 306 over to the server device 106 of FIG. 1 or the monitor device 114 of FIG. 1 for displaying on the location relevant page 304. The location relevant page 304 can be displayed on the first display interface 218 of FIG. 2, the second display interface 226 of FIG. 2, the third display interface 244 of FIG. 2, or the fourth display interface 262 of FIG. 2.

Each of the location-based fields 306 is defined as a unit of the relevant information regarding a particular aspect, characteristic, review, property, label, or sign of the point of interest 308. The point of interest 308 can be found on the website 312. The website 312 is defined as a collection of documents 314 reachable via a network, such as the Internet or an Intranet, where the documents 314 can include the location-based fields 306.

The documents 314 are defined as digital files containing real world location-based information on storage devices. For example, the documents 314 can reside on non-transitory storage medium on the server device 106, non-transitory storage medium on the client device 108 of FIG. 1, or other non-transitory storage medium accessible to the server device 106 or the client device 108. The documents 314 can include navigation-related documents 316. The navigation-related documents 316 are defined as the documents 314 containing relevant information regarding the point of interest 308.

For example, the point of interest 308 can be California Academy of Science (CAS). One of the location-based fields 306 can be the location of CAS. As another example, one of the location-based fields 306 can be the telephone number of CAS. The documents 314 can include a travel document, such as www.tripadvisor.com™. The documents 314 can include the location-based fields 306 of CAS by travelers who had traveled to CAS. Each of the documents 314 can include only a single one of the location-based fields 306 or a plurality of the location-based fields 306.

The location-based fields 306 can be embedded within a markup language code 318 of the documents 314. The location-based fields 306 can include features 320. The features 320 are defined as portions of the markup language code 318 that can serve as syntactic or semantic flags or tags for identifying and locating the location-based fields 306.

For example, the features 320 can include semantic features from the content of the location-based fields 306. For another example, the features 320 can include syntactic features such as Part of Speech (POS) tags, font size, content length, properties derived from regular expression filters, and so on. The properties derived from regular express filters can include whether the location-based fields 306 contain digits or capitalization. The features 320 can further include xpath, html tag, Document Object Model (DOM) attributes or font size of the location-based fields 306.

Xpath is defined as a string in a markup language, such as XML or HTML, for selecting nodes from the document written in the markup language. DOM attributes are defined as attributes of the location-based fields 306 written in a cross-platform and language-independent convention better known as the Document Object Model. Aspects of the DOM (such as its "elements") may be addressed and manipulated within the syntax of the programming or markup language in use.

The location-based guide 302 can also include a route 322. The route 322 is defined as a path that a vehicle or a person with the navigation system 100 can take to reach from a location to the point of interest 308. For example, the route 322 can represent a path from a current location representing Edgewater, N.J. to the point of interest 308 representing New York City.

The physical transformation from displaying the location-based fields 306 result in movement in the physical world, such as a user operating the monitor device 114, a vehicle operated by the user, or a combination thereof, based on the operation of the navigation system 100. The user of the navigation system 100 can select the point of interest 308 from the location relevant page 304 containing the location-based fields 306 harvested by the extraction job 412. The route 322 displayed can start from a current location to the point of interest 308. As the movement in the physical world occurs, the movement itself creates additional information that is converted back to the current location for the continued operation of the navigation system 100 and to continue the movement in the physical world.

Figure 4:
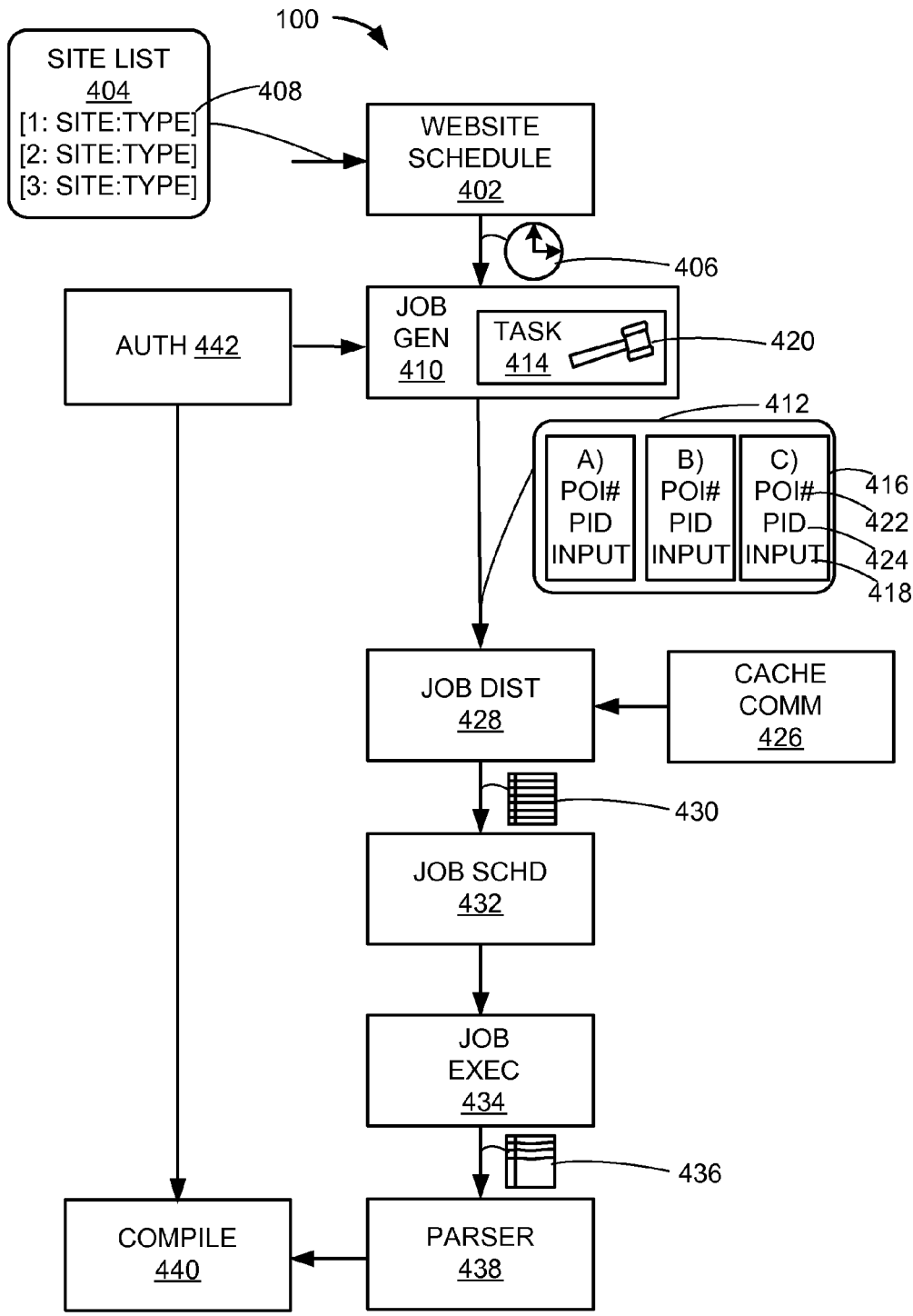
FIG. 4 is a control flow of the navigation system.

Referring now to FIG. 4, therein is shown a control flow of the navigation system 100. The navigation system 100 can include a website schedule module 402. The website schedule module 402 is for scheduling which websites will be crawled based on user-defined configurations. The website schedule module 402 can scan over a site list 404.

The site list 404 is defined as a list of the website 312 of FIG. 3. For each website on the site list 404, the website schedule module 402 can determine when the website 312 needs to be crawled based on the user-defined configurations. The website schedule module 402 can also determine when the website 312 needs to be crawled based on whether the website 312 is has been or is being crawled, whether an error has occurred while attempting to harvest the point of interest 308 of FIG. 3 from the website 312, or a combination thereof. The website schedule module 402 can determine a schedule 406 to crawl each of the website 312 from the site list 404.

The website schedule module 402 can also be for determining a web form type 408 of the website 312. The website schedule module 402 can detect the web form type 408 of the website 312 or receive the web form type 408 along with the site list 404.

The web form type 408 is a category of the website 312 that dictates how the navigation system 100 can interact with it to extract the location-based fields 306 of FIG. 3 related the point of interest 308. The web form type 408 can include a range website. The range website has a pattern of the point of interest 308 in its Uniform Resource Locator ("URL"). For example, the URL for the point of interest 308 can be http://www.xxx.com/ID.html, where "ID" is a continuous range of the point of interest 308, such as zip codes of the point of interest 308.

The web form type 408 can be a directory website. The directory website has a main URL which may list all of the points of interest by its regions in a tree structure, such as Country, State, and City. The web form type 408 can include a location search website. The location search website provides a locator page. For example, zip codes, state, and city can be inputs to the locator page.

The web form type 408 can include a session based website. The session based website has a main URL which can be a start point for harvesting. All or a subset of the pages in the session based website is managed by a session, which means the URLs to those pages cannot be directly use to retrieve the documents 314 of FIG. 3 of the website 312.

The web form type 408 can include a multi-leaf website. The multi-leaf website can have the location-based fields 306 of the point of interest 308 scattered inside several of the documents 314 in the website 312. For example, an address of the point of interest 308 can be in one page, while business hours of the point of interest 308 can be on another page. The web form type 408 can include an application programming interface (API) call website. The API call website can be accessed using Extensible Markup Language (XML) or Java Script Object Notation method calls, where the point of interest 308 can be found in a list returned by the website by providing parameters to the method call.

The web form type 408 can include a latitude and longitude website. The latitude and longitude website can use the latitude and longitude to retrieve the point of interest 308.

The navigation system 100 can include a job generation module 410. The job generation module 410 is for generating an extraction job 412 to crawl the website 312. The extraction job 412 is defined as a collection of executable instructions to harvest points of interest and related fields from a website. The job generation module 410 can be coupled to the website schedule module 402.

The job generation module 410 can generate the extraction job 412 to crawl the website 312 when the website schedule module 402 has scheduled the website 312 to be crawled. The job generation module 410 can function to generate the extraction job 412 including a crawl task 416 based on the location 310 of FIG. 3 of the point of interest 308 and the web form type 408 of the website 312 for harvesting the point of interest 308 from the website 312. The job generation module 410 can reside on the server device 106 of FIG. 1. The job generation module 410 can also reside on the client device 108 of FIG. 1, the cache management device 112 of FIG. 1, or the monitor device 114 of FIG. 1.

The crawl task 416 is defined as an execution step of the extraction job 412. The crawl task 416 can be distributed the client device 108 via the distributed cache 116 of FIG. 1. The crawl task 416 can contain a task status, such as specifying whether the crawl task 416 is "initializing", "in progress", "finished", or "in error".

A current instance of the crawl task 416 can be linked to a previous instance of the crawl task 416. The previous instance of the crawl task 416 is defined as the crawl task 416 generated by the job generation module 410 that preceded a current instance of the crawl task 416, where the previous instance of the crawl task 416 having extracted information that can help the current instance of the crawl task 416 to further crawl the website 312. The crawl task 416 can also include parameters passed by a previous task. For example, a first instance of the crawl task 416 can crawl the website 312 and get all links from the website 312. All or a portion of the links can pass as parameters to a next instance of the crawl task 416. The next instance of the crawl task 416 can then use the parameters as the URL to crawl the documents 314 of FIG. 3 from the links.

The job generation module 410 can include a task module 414. The task module 414 is for generating the crawl task 416 associated with the extraction job 412. The task module 414 can function to generate the crawl task 416 for instructing the client device 108 to interact in a particular manner with the website 312. The task module 414 can be for generating an input list 418 based on the web form type 408 of the website 312. An example of the task module 414 is provided in FIG. 5.

The task module 414 can choose a harvest mechanism 420 based on the web form type 408 of the website 312. The harvest mechanism 420 is defined as a method of generating tasks for the extraction job 412. For example, the range website and the directory website each has a corresponding instance of the harvest mechanism 420. The range website and the directory website are the preferred because of the efficiency of the harvest mechanism 420 associated with the web form type 408. The location search website is not preferred because each search can take longer time than an average task because the location search requires more Server-side calculation.

The crawl task 416 can include rules. The rules describe how the webpage can be crawled. For example, the rules can contain information for URL request, how next level webpage links can be grabbed, or whether JavaScript should be enabled.

The crawl task 416 can include an expected number 422. The expected number 422 is defined as a number of distinct points of interests expected to be found by executing the crawl task 416 by a user of the navigation system 100. The expected number 422 can be verified by using a regular expression selector or a Cascaded Style Sheet locator. The expected number 422 can be useful for verification when the navigation system 100 attempts to parse the documents 314 and acquire the location-based fields 306 and the point of interest 308.

The crawl task 416 can include a parent task tag 424. The parent task tag 424 is defined as an identification number for referencing which task created the current task. The parent task tag 424 can be useful when the point of interest 308 is scattered across multiple pages. The parent task tag 424 can be used to construct a task identification tree, where the location-based fields 306 extracted by the crawl task 416 can be integrated with related the location-based fields 306 from other instances of the crawl task 416 from the same family of tasks.

For example, the crawl task 416 can be a URL discovery task, a session-related task, a website input task, or a range-related task. The URL discovery task is generated when links of the point of interest 308 are extracted from the documents 314. Each of the URL discovery task will download the documents 314 related to the links of the point of interest 308.

Some websites limit access by requiring a real-time session per access to the database of the website, such as requiring a login. The session-related task is generated for each session request.

The website input task is generated for each link generated by the job generation module 410 or the task module 414. The range-related task is a task generated for a range of links generated by the job generation module 410 or the task module 414. Certain URLs generated follow a sequential order, and the range-related task includes an instruction for the client device 108 to download from the full range of URLs.

The navigation system 100 can include a cache communication module 426. The cache communication module 426 is for communicating with the distributed cache 116 to receive information from client nodes connected to the cache management device 112. The cache communication module 426 can function to receive the heartbeat 120 of FIG. 1 from the distributed cache 116 for determining when the client device 108 is available to execute the extraction job 412. The cache communication module 426 can be coupled to the job generation module 410 with the extraction job 412 received from the job generation module 410.

The cache communication module 426 can be for receiving the node load 124 of FIG. 1 for determining when the client device 108 is available to execute the extraction job 412. The cache communication module 426 can be for receiving the heartbeat 120, the node load 124, or both from the distributed cache 116, such as the heartbeat cache portion 122 of FIG. 1. The cache communication module 426 can be for redistributing the crawl task 416 when the client device 108 fails. The cache communication module 426 can reside on the server device 106. The cache communication module 426 can also reside on the client device 108, the cache management device 112, or the monitor device 114. An example of the cache communication module 426 is provided in FIG. 6.

The navigation system 100 can include a job distribution module 428. The job distribution module 428 is for distributing the extraction job 412 to one of the client nodes connected to the cache management device 112. The job distribution module 428 can function to generate assignment schedules 430 of the extraction job 412 based on the heartbeat 120 for distributing the extraction job 412 on the distributed cache 116 to the client device 108 to retrieve the location-based fields 306.

The job distribution module 428 can be coupled to the cache communication module 426 to determine when the client device 108 is available to execute the extraction job 412. The job distribution module 428 can be coupled the job generation module 410 to receive the extraction job 412 from the job generation module 410. The job distribution module 428 can schedule the extraction job 412 to be executed by the client device 108 at a specific time or by a deadline. The job distribution module 428 can reside on the server device 106. The job distribution module 428 can also reside on the client device 108, the cache management device 112, or the monitor device 114.

The job distribution module 428 can generate the assignment schedules 430 including the extraction job 412 assigned to the client device 108. The assignment schedules 430 can be placed on the distributed cache 116 for distribution to the client device 108. The assignment schedules 430 are defined as allocations of instances of the extraction job 412 or the crawl task 416 to a specific client node connected to the distributed cache 116. For example, the assignment schedules 430 can include an allocation of the extraction job 412 or the crawl task 416 to the client device 108. The assignment schedules 430 can include a particular timeline for when to execute the extraction job 412 or the crawl task 416. An example of the job distribution module 428 is provided in FIG. 7.

It has been discovered that assigning the extraction job 412 based on the heartbeat 120 or the node load 124 received from the distributed cache 116 for distributing the extraction job 412 to the client device 108 allows for the navigation system 100 to be more stable. The heartbeat 120 or the node load 124 can be received from the distributed cache 116 to determine whether the client device 108 is capable of executing the extraction job 412. The distributed cache 116 can make sure that the heart beat 120 and the node load 124 are accessible without failure. The heartbeat 120 provides status information of the client device 108, such as processor overload failure, Internet connection failure, or memory failure. The heartbeat 120 allows the navigation system 100 to make assignment of the extraction job 412 more accurately reflect the capability and availability of the client device 108. Accurate assignments lead to a more stable system. Accordingly, assigning the extraction job 412 based on the heartbeat 120 or the node load 124 from the distributed cache 116 for distributing the extraction job 412 to the client device 108 allows for the navigation system 100 to be more stable.

The navigation system 100 can include a job schedule module 432. The job schedule module 432 is for scheduling the extraction job 412 on the client device 108. The job schedule module 432 can function to check continuously the assignment schedules 430. The job schedule module 432 can determine whether the extraction job 412 will be executed immediately based on the node load 124 of the client device 108. The job schedule module 432 can reside on the client device 108. The job schedule module 432 can execute the extraction job 412 on the client device 108 when the memory usage of the client device 108 is above a user-defined memory threshold.

The navigation system 100 can include a job execution module 434. The job execution module 434 is for executing the extraction job 412 on the client device 108. The job execution module 434 can function to remove the extraction job 412 from the assignment schedules 430 in the distributed cache 116 and place the extraction job 412 on an initialized job list 436 in the distributed cache 116. The initialized job list 436 is defined as a list of all instances of the extraction job 412 that is currently running. The job execution module 434 can function to generate the crawl task 416 associated with the extraction job 412. The job execution module 434 can also function to receive the crawl task 416 associated with the extraction job 412 from the distributed cache 116. An example of the job execution module 434 is provided in FIG. 8.

The navigation system 100 can include a parser module 438. The parser module 438 is for parsing the documents 314 downloaded from the website 312 and retrieve the point of interest 308 and the location-based fields 306. The parser module 438 can organize and sort the location-based fields 306. The parser module 438 can load the documents 314, and use regular expression rules or cascading style sheet locators to identify each property of the point of interest 308. The parser module 438 can store the location-based fields 306 on the database 126 of FIG. 1 or the distributed cache 116.

The navigation system 100 can include a compiler module 440. The compiler module 440 is for compiling the location-based fields 306 retrieved from the client device 108. The compiler module 440 can function to receive the location-based fields 306 associated with the point of interest 308 for displaying on the monitor device 114. The location-based fields 306 can be transferred to the compiler module 440 via the distributed cache 116 managed by the cache management device 112. The compiler module 440 can receive the location-based fields 306 from the distributed cache 116. The compiler module 440 can reside on the server device 106. The compiler module 440 can also reside on the client device 108, the cache management device 112, or the monitor device 114.

The navigation system 100 can include an authorization module 442. The authorization module 442 is for controlling permission to operate the navigation system 100. The authorization module 442 can be coupled to the job generation module 410. The authorization module 442 can also be coupled to the compiler module 440. The authorization module 442 can provide multiple levels of access for different users. For example, an administration user group can have the power to modify a configuration of the job generation module 410, while a normal user group only has power to browse the location-based fields 306 from the compiler module 440.

The first software 212 of FIG. 2 of the server device 106 can include the navigation system 100. For example, the first software 212 can include the job generation module 410, the cache communication module 426, the job distribution module 428, and the compiler module 440.

The first control unit 202 of FIG. 2 can execute the first software 212 for the job generation module 410 to generate the extraction job 412 including the crawl task 416 based on the location 310 of the point of interest 308 and the web form type 408 of the website 312 for harvesting the point of interest 308 from the website 312. The first control unit 202 can execute the first software 212 for the cache communication module 426 to receive the heartbeat 120 from the distributed cache 116 for determining when the client device 108 is available to execute the extraction job 412. The first control unit 202 can execute the first software 212 for the job distribution module 428 to generate the assignment schedules 430 of the extraction job 412 based on the heartbeat 120 for distributing the extraction job 412 on the distributed cache 116 to the client device 108 to retrieve the location-based fields 306. The first control unit 202 can execute the first software 212 for the compiler module 440 to receive the location-based fields 306 associated with the point of interest 308 for displaying on the monitor device 114.

The fourth control unit 256 of FIG. 2 can execute the fourth display interface 262 of FIG. 2 to display the location-based fields 306. The fourth control unit 256 can also execute the first display interface 218 of FIG. 2 to display the point of interest 308.

The second software 228 of FIG. 2 of the client device 108 of FIG. 1 can include the navigation system 100. For example, the second software 228 can include the job generation module 410, the cache communication module 426, the job distribution module 428, and the compiler module 440.

The second control unit 220 of FIG. 2 can execute the second software 228 for the job generation module 410 to generate the extraction job 412 including the crawl task 416 based on the location 310 of the point of interest 308 and the web form type 408 of the website 312 for harvesting the point of interest 308 from the website 312. The second control unit 220 can execute the second software 228 for the cache communication module 426 to receive the heartbeat 120 from the distributed cache 116 for determining when the client device 108 is available to execute the extraction job 412.

The second control unit 220 can execute the second software 228 for the job distribution module 428 to generate the assignment schedules 430 of the extraction job 412 based on the heartbeat 120 for distributing the extraction job 412 on the distributed cache 116 to the client device 108 to retrieve the location-based fields 306. The second control unit 220 can execute the second software 228 for the compiler module 440 to receive the location-based fields 306 associated with the point of interest 308 for displaying on the monitor device 114. The second control unit 220 can execute the second display interface 226 of FIG. 2 to display the location-based fields 306. The second control unit 220 can also execute the second display interface 226 of FIG. 2 to display the location-based fields 306. The second control unit 220 can further execute the second display interface 226 of FIG. 2 to display the location-based fields 306.

The navigation system 100 can be partitioned between the first software 212 and the second software 228. For example, the second software 228 can include the cache communication module 426, the job distribution module 428, and the compiler module 440. The second control unit 220 can execute modules partitioned on the second software 228 as previously described.

The first software 212 can include the job generation module 410. Based on the size of the first storage unit 204, the first software 212 can include additional modules of the navigation system 100. The first control unit 202 can execute the modules partitioned on the first software 212 as previously described.

The first user interface 208 of FIG. 2 can receive the expected number 422 from the user, the navigation system 100, or a combination thereof for the compiler module 440, for example. The second control unit 220 can operate the second communication unit 222 to send the location-based fields 306 to the server device 106. The first control unit 202 can operate the first communication unit 206 to do the same.

The second communication unit 222 of FIG. 2 can send the location-based fields 306 to the server device 106 through the communication channel 110 of FIG. 1 or the distributed cache 116. The location-based fields 306, the point of interest 308, or a combination thereof can be displayed on the first display interface 218, the second display interface 226, or preferably the fourth display interface 262.

The navigation system 100 describes the module functions or order as an example. The modules can be partitioned differently. Each of the modules can operate individually and independently of the other modules.

Furthermore, data generated in one module can be used by another module without being directly coupled to each other. For example, the compiler module 440 can receive the point of interest 308 associated with the extraction job 412 from the job generation module 410 to display.

The job generation module 410, the cache communication module 426, the job distribution module 428, the compiler module 440, the authorization module 442, the website schedule module 402, the job schedule module 432, the job execution module 434, the parser module 438, or the task module 414 can be implemented as hardware (not shown) within the first control unit 202, the second control unit 220, the third control unit 238, the fourth control unit 256, or special hardware (not shown) in the server device 106, the client device 108, the cache management device 112, or the monitor device 114.

The physical transformation from displaying the location-based fields 306 result in movement in the physical world, such as a user operating the monitor device 114, a vehicle operated by the user, or a combination thereof, based on the operation of the navigation system 100. The user of the navigation system 100 can select the point of interest 308 from the location relevant page 304 containing the location-based fields 306 harvested by the extraction job 412. The route 322 displayed can start from a current location to the point of interest 308. As the movement in the physical world occurs, the movement itself creates additional information that is converted back to the current location for the continued operation of the navigation system 100 and to continue the movement in the physical world.

Figure 5:
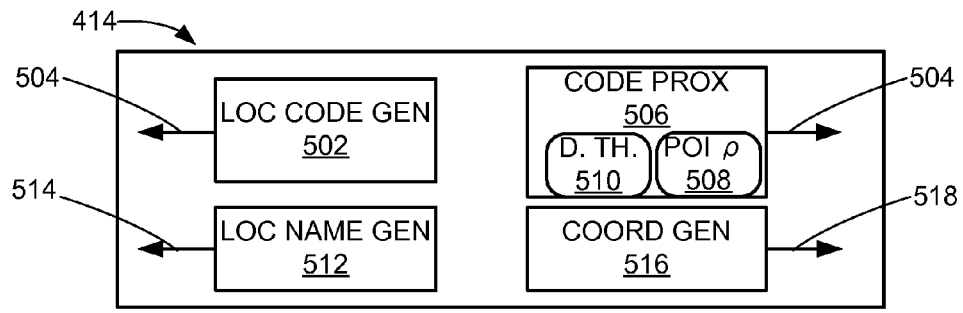
FIG. 5 is a control flow of the task module.

Referring now to FIG. 5, therein is shown a control flow of the task module 414. The task module 414 can include a location code module 502. The location code module 502 is for generating a region code 504 as an input to the website 312 of FIG. 3. The region code 504 is defined as a zoning code for identifying unique areas within a geographical boundary. The region code 504 can include the ZIP code established by the United States Postal Service.

The location code module 502 can generate a list of the region code 504. For example, the location code module 502 can generate every possible value of the region code 504 across a country. The region code 504 can be continuous numeric values. For another example, the location code module 502 can generate the region code 504 only at certain numeric intervals.

The task module 414 can include a code proximity module 506. The code proximity module 506 is for generating the region code 504 as an input to the website 312 based on a point of interest density 508. The point of interest density 508 is defined as a measure of the average proximity of a point of interest from the next nearest unique point of interest. The code proximity module 506 can generate the region code 504 as an input to the website 312 intervals where instances of the region code 504 are outside of a distance threshold 510 from each other.

The code proximity module 506 can be coupled to the location code module 502 to prevent the region code 504 from being generated by the location code module 502 based on the point of interest density 508. For example, the code proximity module 506 can remove the region code 504 within the distance threshold 510 of a previously generated instance of the region code 504 from the location code module 502. The distance threshold 510 is a user-defined threshold distance range.

The task module 414 can include a location name module 512. The location name module 512 is for generating a location identification 514 as an input to the website 312. The location identification 514 is defined as a word or phrase used to describe a unique geographical area. For example, the location identification 514 can be a state name, such as "California", or a province name, such as "Hunan". The location name module 512 can generate the location identification 514 or a list of different instances of the location identification 514 as an input or inputs to the website 312.

The task module 414 can include a coordinate module 516. The coordinate module 516 is for generating the coordinate 518 as an input to the website 312. The coordinate 518 is defined as at least two values used to define a geographic point. For example, the coordinate 518 can be a latitude and longitude pair. The coordinate module 516 can divide a geographical region into small pieces and generate the coordinate 518 of the center of each piece for collecting the point of interest 308 of FIG. 3 and the location-based fields 306 of FIG. 3 in those pieces. The coordinate module 516 can size each piece of the geographical region based on the point of interest density 508 in the geographical region.

The task module 414 can use the region code 504 from the location code module 502 to generate the crawl task 416 for instructing the client device 108 to enter the region code 504 to the website 312 for harvesting the point of interest 308 and the location-based fields 306. The task module 414 can use the region code 504 from the code proximity module 506 to generate the crawl task 416 for instructing the client device 108 to enter the region code 504 to the website 312 for harvesting the point of interest 308 and the location-based fields 306.

The task module 414 can use the location identification 514 from the location name module 512 to generate the crawl task 416 for instructing the client device 108 to enter the location name module 512 to the website 312 for harvesting the point of interest 308 and the location-based fields 306. The task module 414 can use the coordinate 518 from the coordinate module 516 to generate the crawl task 416 for instructing the client device 108 to enter the coordinate 518 to the website 312 for harvesting the point of interest 308 and the location-based fields 306.

It has been discovered that generating the region code 504, the location identification 514, or the coordinate 518 provides the navigation system 100 a quicker way to locate relevant point of interest information on a website. For example, when zip codes are continuous, the region code 504 generated can pick one zip code among several continuous zip codes to enter into the website 312 to locate the relevant point of interest information. The location identification 514 and the coordinate 518 provides ways of interacting the website 312 to minimize the number of interactions with the website 312 while getting the maximum number of unique instances of the location-based fields 306 and the point of interest 308. Accordingly, generating the region code 504, the location identification 514, or the coordinate 518 provides the navigation system 100 with a quicker way to locate relevant point of interest information on a website.

The location code module 502, the code proximity module 506, the location name module 512, or the coordinate module 516 can be implemented as hardware (not shown) within the first control unit 202 of FIG. 2, the second control unit 220 of FIG. 2, the third control unit 238 of FIG. 2, the fourth control unit 256 of FIG. 2, or special hardware (not shown) in the server device 106 of FIG. 1, the client device 108 of FIG. 1, the cache management device 112 of FIG. 1, or the monitor device 114 of FIG. 1.

Figure 6:
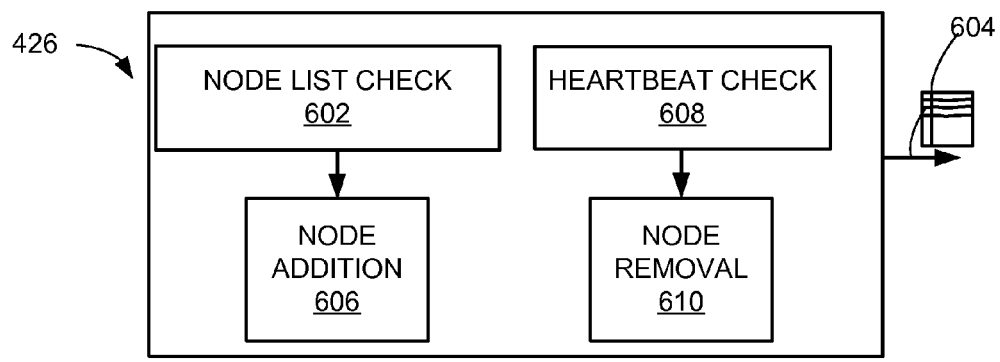
FIG. 6 is a control flow of the cache communication module.

Referring now to FIG. 6, therein is shown a control flow of the cache communication module 426. The cache communication module 426 can include a node list check module 602. The node list check module 602 is for checking the distributed cache 116 of FIG. 1 for availability of a client node. When the client device 108 of FIG. 1 starts, the client device 108 can add itself on the node cache portion 118 of the distributed cache 116. The node list check module 602 can check the distributed cache 116 to see if a new node, such as the client device 108, appears in the node cache portion 118 of FIG. 1 of the distributed cache 116 by comparing the node cache portion 118 to a local node list 604. The local node list 604 is defined as a list of existing client nodes available as part of the navigation system 100, where the list is stored on the first storage unit 204 of FIG. 2 of the server device 106 of FIG. 1.

The cache communication module 426 can include an node addition module 606. The node addition module 606 is for adding a node into the local node list 604 when the node is detected in the distributed cache 116. When a new node is detected in the node cache portion 118 of the distributed cache 116 via the node list check module 602, the node addition module 606 can add the new node, such as the client device 108, to the local node list 604.

The cache communication module 426 can include a heartbeat check module 608. The heartbeat check module 608 is for checking the heartbeat cache portion 122 of FIG. 1 of the distributed cache 116 for the heartbeat 120 of FIG. 1 of each node on the local node list 604. When the heartbeat check module 608 receives the heartbeat 120 of a node not in the local node list 604, the node addition module 606 can add the node to the local node list 604.

The cache communication module 426 can include a node removal module 610. The node removal module 610 is for removing a node from the operation of the navigation system 100, including remove the node from the local node list 604, the node cache portion 118, or a combination thereof. When the heartbeat check module 608 stops receiving the heartbeat 120 from a node on the local node list 604 on the heartbeat cache portion 122 of the distributed cache 116, the node removal module 610 can remove the node, such as the client device 108, from the local node list 604. Optionally, the node removal module 610 can remove the node from the node cache portion 118 of the distributed cache 116 when the heartbeat check module 608 stops receiving the heartbeat 120 from the node. The node removal module 610 can reassign the extraction job 412 associated with the node removed.

The node list check module 602, the heartbeat check module 608, the node addition module 606, or the node removal module 610 can be implemented as hardware (not shown) within the first control unit 202 of FIG. 2, the second control unit 220 of FIG. 2, the third control unit 238 of FIG. 2, the fourth control unit 256 of FIG. 2, or special hardware (not shown) in the server device 106 of FIG. 1, the client device 108, the cache management device 112 of FIG. 1, or the monitor device 114 of FIG. 1.

Figure 7:
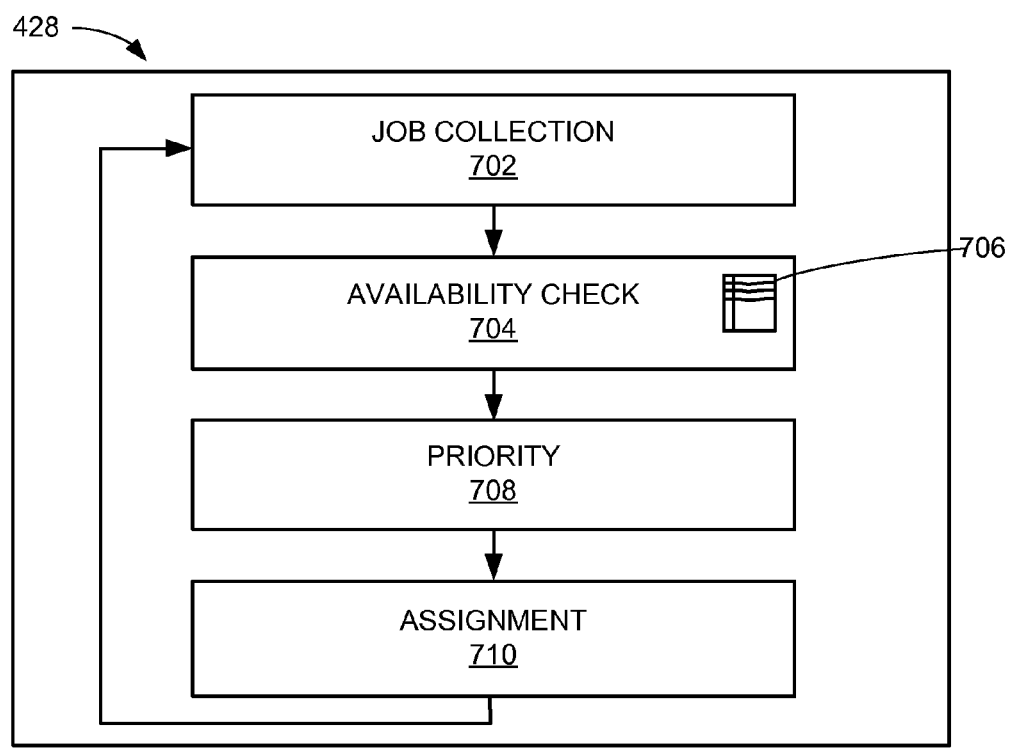
FIG. 7 is a control flow of the job distribution module.

Referring now to FIG. 7, therein is shown a control flow of the job distribution module 428. The job distribution module 428 can include a job collection module 702. The job collection module 702 is for collecting the extraction job 412 of FIG. 4 to distribute. The job collection module 702 can be coupled to the cache communication module 426 of FIG. 4, and receive the extraction job 412 from the cache communication module 426. The job collection module 702 can connect to the distributed cache 116 of FIG. 1, and receive the extraction job 412 from the distributed cache 116.

The job distribution module 428 can include an availability check module 704. The availability check module 704 can be coupled to the job collection module 702. The availability check module 704 is for determining for every node in the node cache portion 118 of FIG. 1 whether the node contains the extraction job 412 received from the job collection module 702, and generating an available node list 706 of the nodes without the extraction job 412.

The available node list 706 is defined as a set of available nodes, connected to the distributed cache 116 that can function as the client device 108. For example, the availability check module 704 can determine whether the client device 108 of FIG. 1 contains the extraction job 412 received from the job collection module 702 and add the client device 108 to the available node list 706 when the client device 108 is without the extraction job 412 received from the job collection module 702. The available node list 706 can be sorted.

The job distribution module 428 can include a priority module 708. The priority module 708 can be coupled to the availability check module 704. The priority module 708 can also be coupled to the job collection module 702. The priority module 708 is for prioritizing available nodes including the client device 108 on the available node list 706 received from the availability check module 704 for distributing the extraction job 412 collected by the job collection module 702. The priority module 708 can be coupled to the cache communication module 426. The priority module 708 can sort the available node list 706 based on the node load 124 of FIG. 1 of the available node on the available node list 706 with the node load 124 received from the cache communication module 426.

The job distribution module 428 can include an assignment module 710. The assignment module 710 can be coupled to the priority module 708. The assignment module 710 is for distributing jobs to client node devices. The assignment module 710 can distribute the extraction job 412 to the client device 108 which has a higher priority on the available node list 706. For example, the assignment module 710 can be for distributing the extraction job 412 collected from the job collection module 702. The assignment module 710 can generate the assignment schedules 430 of FIG. 4 based on the available node list 706 that is sorted by the priority module 708. The assignment module 710 can also prioritize the assignment schedules 430 based on the web form type 408 of FIG. 4 of the website 312 of FIG. 3. The assignment module 710 can distribute the assignment schedules 430 on the distributed cache 116. The assignment module 710 can distribute the assignment schedules 430 directly with the client device 108 associated with each of the assignment schedules 430.

The job collection module 702, the availability check module 704, the priority module 708, or the assignment module 710 can be implemented as hardware (not shown) within the first control unit 202 of FIG. 2, the second control unit 220 of FIG. 2, the third control unit 238 of FIG. 2, the fourth control unit 256 of FIG. 2, or special hardware (not shown) in the server device 106 of FIG. 1, the client device 108, the cache management device 112 of FIG. 1, or the monitor device 114 of FIG. 1.

Figure 8:
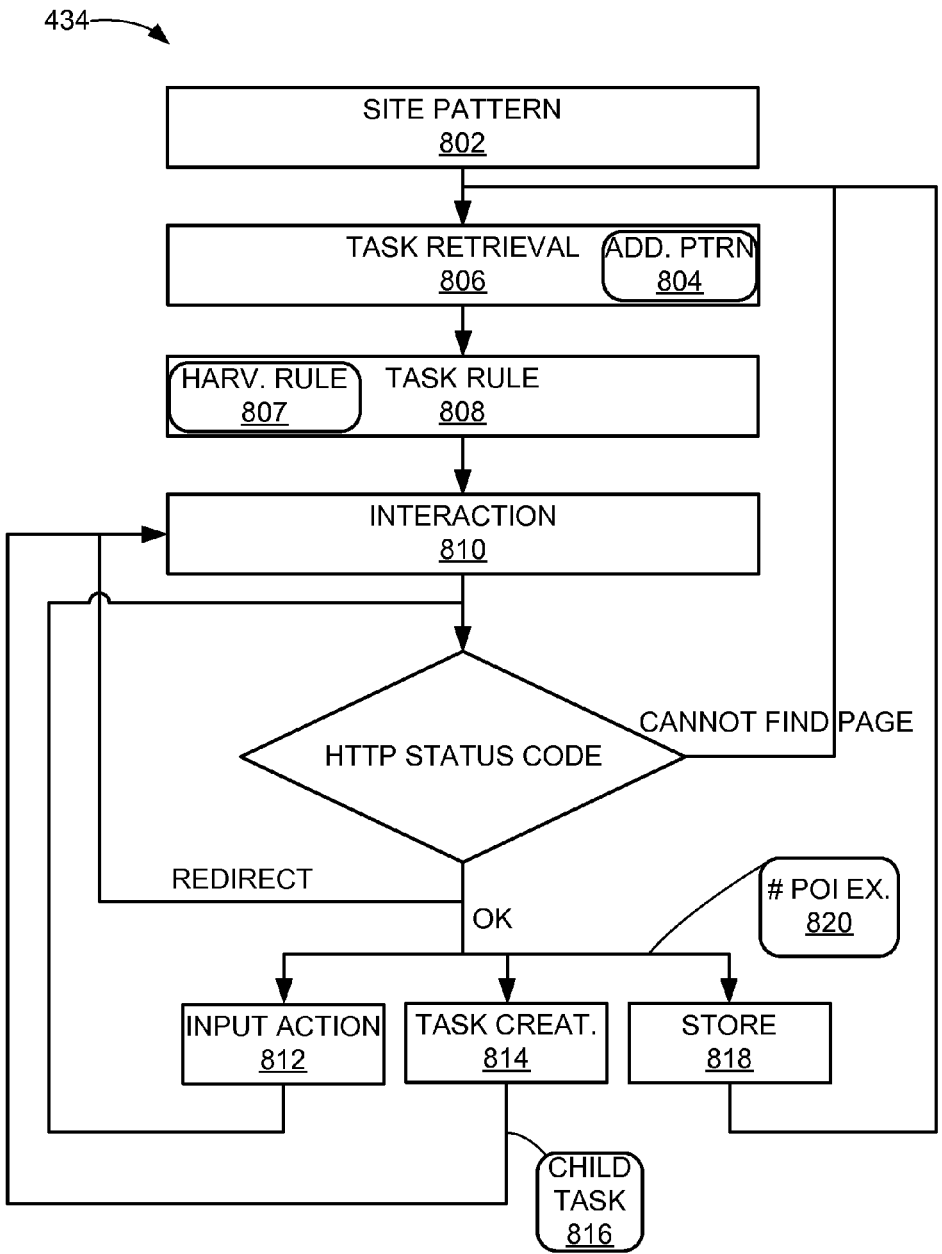
FIG. 8 is a control flow of the job execution module.

Referring now to FIG. 8, therein is shown a control flow of the job execution module 434. The job execution module 434 can include a site pattern module 802. The site pattern module 802 is for determining whether an address pattern 804 is forbidden by the website 312 to crawl. The address pattern 804 is defined as an address on the Internet to retrieve one of the documents 314 of FIG. 3 on the website 312. For example, the site pattern module 802 can determine the address pattern 804 to crawl by retrieving the "Robot.txt" from the website 312 which can list the address pattern 804 which are forbidden by the website 312.

The job execution module 434 can include a task retrieval module 806. The task retrieval module 806 is for retrieving a harvesting task to execute on the client device 108 where the job execution module 434 is residing. The task retrieval module 806 can be coupled to the site pattern module 802. The task retrieval module 806 can stop the operation of the job execution module 434 when the address pattern 804 is determined to be forbidden by the website 312. The site pattern module 802 can report error when the address pattern 804 is determined to be forbidden by the website 312.

When the site pattern module 802 has determined the address pattern 804 is not forbidden by the website 312, the task retrieval module 806 can retrieve the crawl task 416 of FIG. 4 associated with the extraction job 412 of FIG. 4 assigned to the client device 108, with the extraction job 412 retrieved from the job distribution module 428 of FIG. 4 or the distributed cache 116 of FIG. 1.

The job execution module 434 can include a task rule module 808. The task rule module 808 can be coupled to the task retrieval module 806. The task rule module 808 is for retrieving a harvest rule 807 to execute the crawl task 416 received from the task retrieval module 806. The harvest rule 807 is defined as a preference or requirement for harvesting the location-based fields 306 of FIG. 3 related to the point of interest 308 of FIG. 3 from the website 312. For example, the task rule module 808 can retrieve the harvest rule 807 related to which the address pattern 804 to access from the website 312. The harvest rule 807 can be a setting to enable or disable JavaScript, Flash™, image download, or other Internet browsing setting. The harvest rule 807 can be a set of instruction to generate a session while accessing the website 312.

The job execution module 434 can include an interaction module 810. The interaction module 810 can be coupled to the task rule module 808. The interaction module 810 is for interacting with the website 312 based on the harvest rule 807 received from the task rule module 808. For example, the interaction module 810 can be for accessing the address pattern 804 from the website 312 based on the harvest rule 807 to retrieve at least one of the documents 314. The interaction module 810 can be for extracting at least one of the location-based fields 306 from the website 312 by interacting with the website 312 based on the harvest rule 807.

When interacting with the website 312, the job execution module 434 can receive a HyperText Transfer Protocol (HTTP) status code. When the status code relates to a page not being found, the crawl task 416 can be stopped, but the extraction job 412 can continue its operation by executing other instances of the crawl task 416 retrieved by the task retrieval module 806. When accessing the website 312, the website 312 can sometimes redirect the job execution module 434 a different URL other than the URL intended by the crawl task 416. In this case, the interaction module 810 can follow the harvest rule 807 in order to continue the crawl task 416.

The job execution module 434 can include an input module 812. The input module 812 can be coupled to the interaction module 810. The input module 812 is for executing an input to the website 312 when at least one of the location-based fields 306 extracted from the interaction module 810 is a component of the website 312 which can be clicked, interacted with, or entered with an input. For example, the input module 812 can be for pressing a search button, entering text in a textbox, clicking on an icon, scrolling a mouse, or a combination thereof.

The job execution module 434 can include a task creation module 814. The task creation module 814 can be coupled to the interaction module 810. The task creation module 814 is for creating a child task 816 when at least one of the location-based fields 306 extracted from the interaction module 810 is an instance of the address pattern 804. The child task 816 is defined as a task generated based on execution of the current instance of the crawl task 416.

The job execution module 434 can include a store module 818. The store module 818 can be coupled to the interaction module 810. The store module 818 is for storing at least one instance of the documents 314 retrieved by the interaction module 810. The store module 818 can download the at least one instance of the documents 314 when a save condition from the harvest rule 807 is met. The store module 818 can identify and store a unique identifier specific to the website 312 of the point of interest 308 from the at least one instance of the documents 314 extracted for other tasks of the extraction job 412.

The store module 818 can receive the expected number 422 of FIG. 4 from the user of the navigation system 100 of FIG. 1. The expected number 422 can include a user-defined number of points of interests that the user expects to find on an instance of the documents 314 of the website 312. The store module 818 can use a CSS locator or a regular expression searcher to find out an extracted number 820, which can be used to compare against the expected number 422. The extracted number 820 is defined as a number of instances of the point of interest 308 within the at least one of the documents 314. The store module 818 can halt the crawl task 416 when the extracted number 820 is same as the expected number 422.

The site pattern module 802, the task retrieval module 806, the task rule module 808, the interaction module 810, the input module 812, the task creation module 814, or the store module 818 can be implemented as hardware (not shown) within the first control unit 202 of FIG. 2, the second control unit 220 of FIG. 2, the third control unit 238 of FIG. 2, the fourth control unit 256 of FIG. 2, or special hardware (not shown) in the server device 106 of FIG. 1, the client device 108 of FIG. 1, the cache management device 112 of FIG. 1, or the monitor device 114 of FIG. 1.

Figure 9:
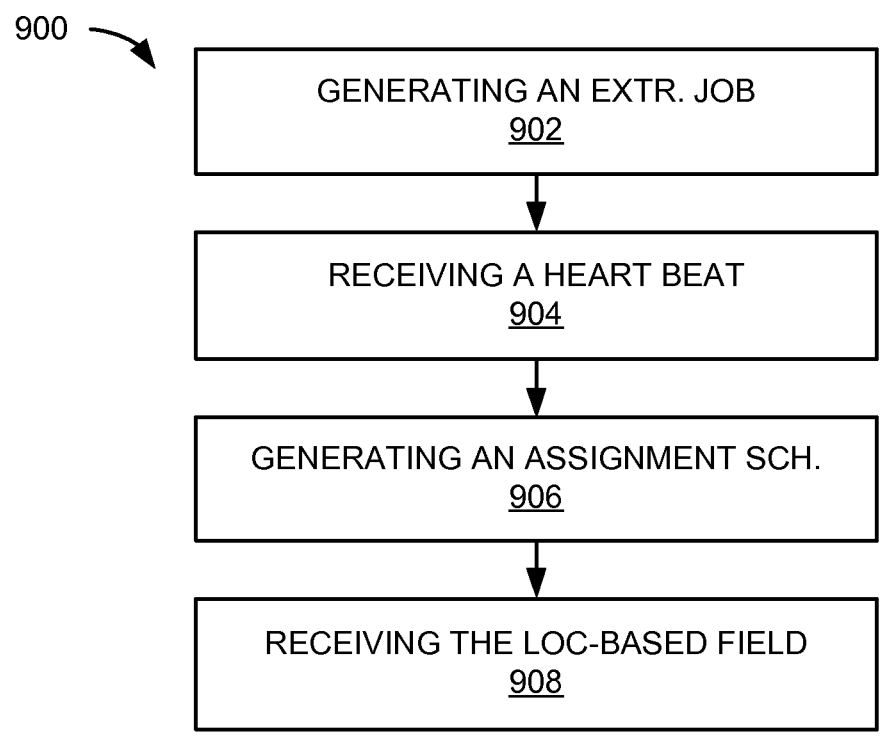
FIG. 9 is a flow chart of a method of operation of the navigation system of FIG. 1 in a further embodiment of the present invention.

Referring now to FIG. 9, therein is shown a flow chart of a method 900 of operation of the navigation system 100 of FIG. 1 in a further embodiment of the present invention. The method 900 includes: generating an extraction job including a crawl task based on a location of a point of interest and a web form type of a website for harvesting the point of interest from the website, in a block 902; receiving a heartbeat from a distributed cache for determining when a client device is available to execute the extraction job, in a block 904; generating an assignment schedule of the extraction job based on the heartbeat for distributing the extraction job to the client device to retrieve a location-based field, in a block 906; and receiving the location-based field associated with the point of interest for displaying on a monitor device, in a block 908.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    generating an extraction job including a crawl task based on a location of a point of interest and a web form type of a website for harvesting the point of interest from the website;
    receiving a heartbeat from a distributed cache for determining when a client device is available to execute the extraction job;
    generating an assignment schedule of the extraction job based on the heartbeat for distributing the extraction job to the client device to retrieve a location-based field; and
    receiving the location-based field associated with the point of interest for displaying on a monitor device.

2. The method as claimed in claim 1 wherein generating the extraction job includes generating an input list based the web form type of the website.

3. The method as claimed in claim 1 wherein generating the extraction job includes generating a region code of the point of interest.

4. The method as claimed in claim 1 wherein generating the extraction job includes generating a region code of the point of interest selectively based on a point of interest density.

5. The method as claimed in claim 1 wherein generating the extraction job includes generating a location identification for inputting to the website.

6. A method of operation of a navigation system comprising:

generating an extraction job including a crawl task based on a location of a point of interest and a web form type of a website for harvesting the point of interest from the website;

receiving a heartbeat and a node load from a distributed cache for determining when a client device is available to execute the extraction job;

generating an assignment schedule of the extraction job based on the heartbeat and the node load for distributing the extraction job to the client device to retrieve a location-based field; and receiving the location-based field associated with the point of interest for displaying on a monitor device.

7. The method as claimed in claim 6 wherein generating the extraction job includes generating a coordinate for inputting to the website.

8. The method as claimed in claim 6 further comprising: receiving an expected number associated with the crawl task for halting the crawl task when an extracted number of the point of interest from executing the crawl task exceeds the expected number.

9. The method as claimed in claim 6 further comprising: determining the web form type of the website; and prioritizing the assignment schedule based on the web form type of the website of the extraction job.

10. The method as claimed in claim 6 wherein generating the extraction job include associating the crawl task with a parent task tag.

11. A navigation system comprising:
a job generation module for generating an extraction job including a crawl task based on a location of a point of interest and a web form type of a website for harvesting the point of interest from the website;
a cache communication module, coupled to the job generation module, for receiving a heartbeat from a distributed cache for determining when a client device is available to execute the extraction job;
a job distribution module, coupled to the cache communication module, for generating an assignment schedule of the extraction job based on the heartbeat for distributing the extraction job to the client device to retrieve a location-based field; and
a compiler module, coupled to the job distribution module, for receiving the location-based field associated with the point of interest for displaying on a monitor device.

12. The system as claimed in claim 11 wherein the job generation module is for generating an input list based the web form type of the website.

13. The system as claimed in claim 11 wherein the job generation module is for generating a region code of the point of interest.

14. The system as claimed in claim 11 wherein the job generation module is for generating a region code of the point of interest selectively based on a point of interest density.

15. The system as claimed in claim 11 wherein the job generation module is for generating a location identification for inputting to the website.

16. The system as claimed in claim 11 wherein:
the cache communication module is for receiving the heartbeat and a node load from the distributed cache for determining when the client device is available to execute the extraction job; and
the job distribution module is for generating the assignment schedule of the extraction job based on the heartbeat and the node load for distributing the extraction job to the client device to retrieve the location-based field.

17. The system as claimed in claim 16 wherein the job generation module is for generating a coordinate for inputting to the website.

18. The system as claimed in claim 16 wherein the job distribution module is for receiving an expected number associated with the crawl task for halting the crawl task when an extracted number of the point of interest from executing the crawl task exceeds the expected number.

19. The system as claimed in claim 16 further comprising:
a website schedule module, coupled to the job generation module, for determining the web form type of the website; and
wherein:
the job distribution module is for prioritizing the assignment schedule based on the web form type of the website of the extraction job.

20. The system as claimed in claim 16 wherein the job generation module is for associating the crawl task with a parent task tag.

* * * * *